United States Patent
Hirasawa

(10) Patent No.: US 10,627,989 B2
(45) Date of Patent: Apr. 21, 2020

(54) DISPLAY CONTROL DEVICE, DISPLAY CONTROL METHOD AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya, Aichi (JP)

(72) Inventor: Yoshi Hirasawa, Anjo (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/935,632

(22) Filed: Mar. 26, 2018

(65) Prior Publication Data

US 2019/0004680 A1    Jan. 3, 2019

(30) Foreign Application Priority Data

Jun. 30, 2017    (JP) .................. 2017-128310

(51) Int. Cl.
| | | |
|---|---|---|
| G06F 3/048 | (2013.01) | |
| G06F 17/00 | (2019.01) | |
| G06F 3/0481 | (2013.01) | |
| G06F 3/0484 | (2013.01) | |
| G06F 3/0483 | (2013.01) | |

(52) U.S. Cl.
CPC ........ G06F 3/04817 (2013.01); G06F 3/0483 (2013.01); G06F 3/04847 (2013.01)

(58) Field of Classification Search
CPC .................................................. G06F 3/0482
USPC ......................................... 715/825, 200, 765
See application file for complete search history.

(56) References Cited

U.S. PATENT DOCUMENTS

| | | | | |
|---|---|---|---|---|
| 7,774,366 B2 * | 8/2010 | Fisher | ................... | G06F 3/0484 |
| | | | | 707/784 |
| 7,921,372 B2 * | 4/2011 | Sauve | ................... | G06F 3/0481 |
| | | | | 715/767 |
| 8,375,321 B2 * | 2/2013 | Cruz Moreno | ....... | G06F 16/957 |
| | | | | 715/777 |
| 2006/0206834 A1 * | 9/2006 | Fisher | ................... | G06F 3/0484 |
| | | | | 715/777 |
| 2010/0287490 A1 | 11/2010 | Ichimi | | |

(Continued)

FOREIGN PATENT DOCUMENTS

| | | |
|---|---|---|
| JP | 2010-262501 A | 11/2010 |
| JP | 2016-157232 A | 9/2016 |

*Primary Examiner* — Manglesh M Patel
(74) *Attorney, Agent, or Firm* — Scully, Scott, Murphy & Presser, P.C.

(57) ABSTRACT

A controller of a display control device is configured to execute causing the display control device to display a plurality of tabs, and a tab screen corresponding a selected tab. A plurality of icons are arrangeable on the tab screen. The plurality of icons includes a particular icon assigned with a particular process. When a particular selecting operation to select two or more common tab screens is received, a common area is set to each of the common tab screens. When a particular arranging operation is received to arrange the particular icons with respect to the common area in the common tab screen currently displayed on the display, and the particular icons assigned with the particular processes are arranged to the common areas of all the common tab screens based on the arranging operation.

13 Claims, 11 Drawing Sheets

(56) References Cited

U.S. PATENT DOCUMENTS

2011/0313805 A1* 12/2011 Heydemann ........... G06Q 10/06
                                                    705/7.14
2014/0250390 A1*  9/2014 Holmes ............... G06F 3/04817
                                                    715/760

* cited by examiner

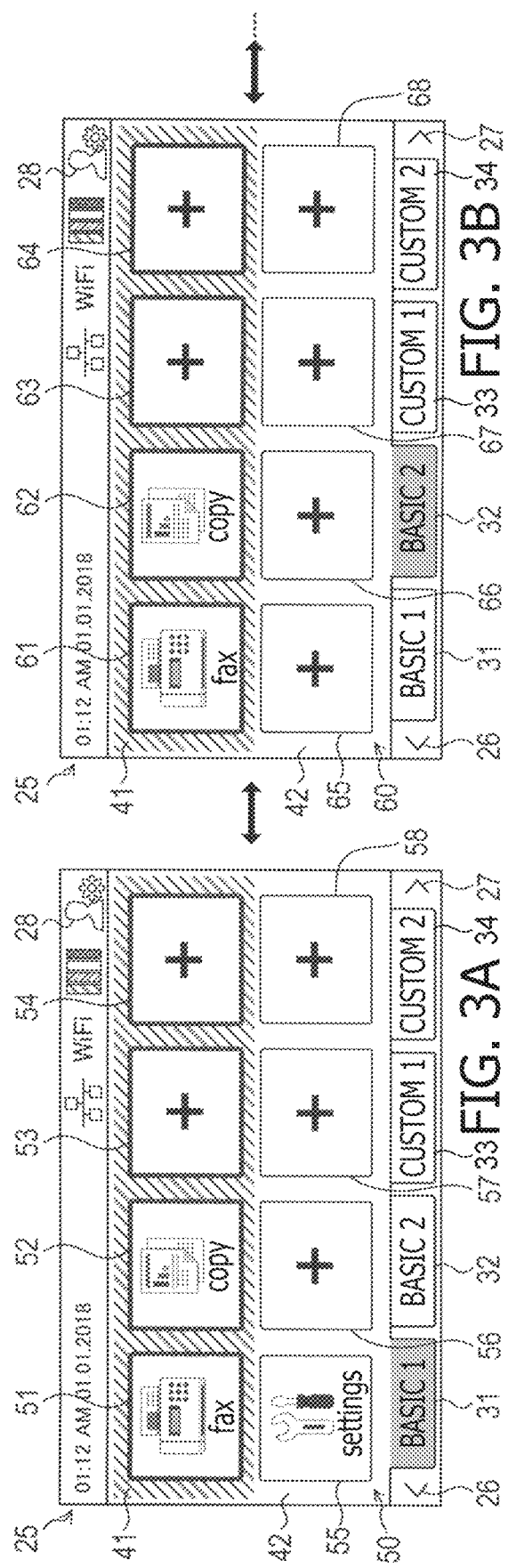
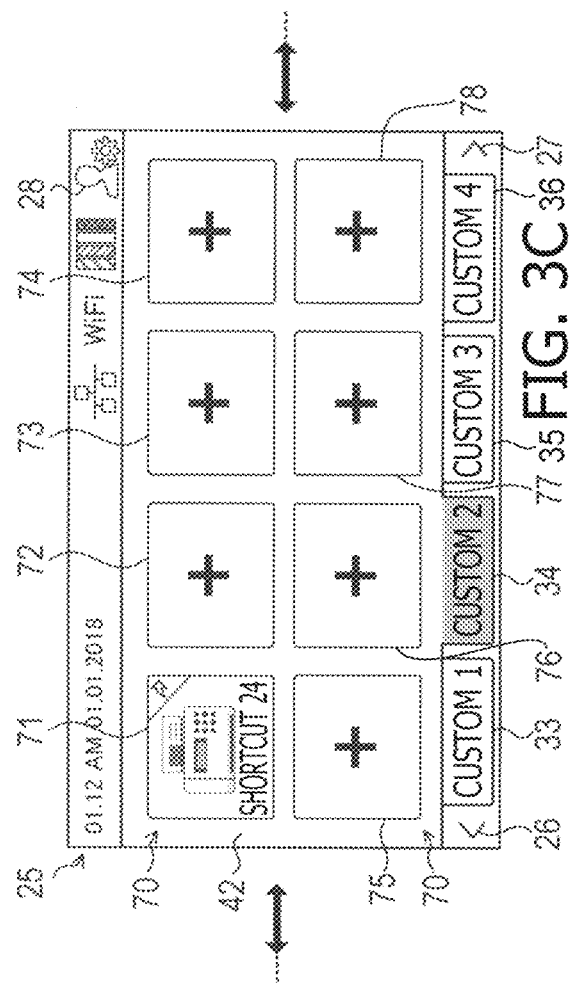
FIG. 3A
FIG. 3B
FIG. 3C

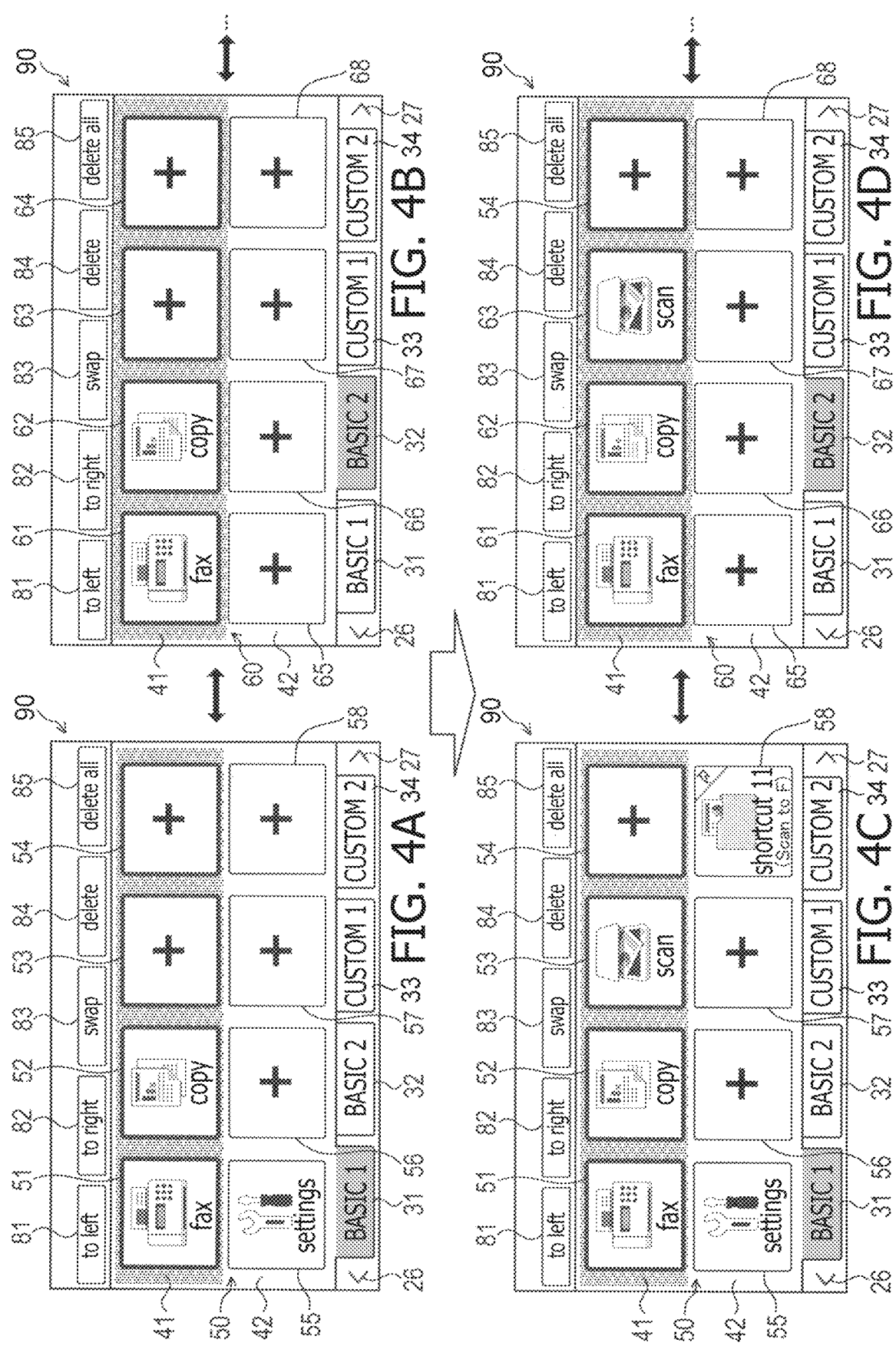

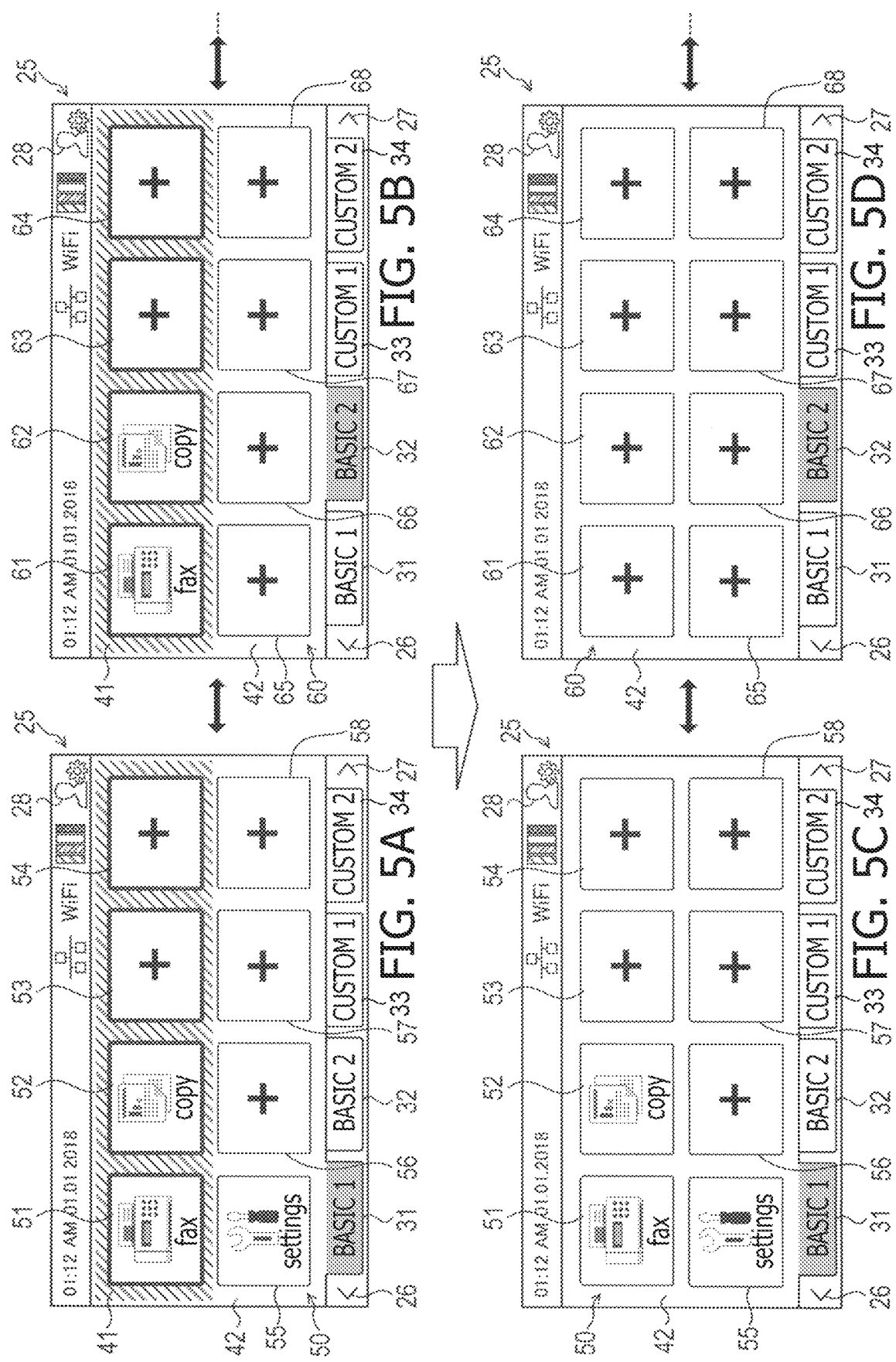

DISPLAY CONTROL DEVICE, DISPLAY CONTROL METHOD AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2017-128310 filed on Jun. 30, 2017. The entire subject matter of the application is incorporated herein by reference.

BACKGROUND

Technical Field

The present disclosures relate to a technique of controlling contents of a screen displayed on a display.

Related Art

There has been known a device configured to display a tab-selection type standby screen on a touch panel, and displayed contents of an execution menu can be switched by switching the selected tabs.

SUMMARY

In the above-described device, a plurality of buttons respectively assigned with particular processes are arranged in each tab. The user can arbitrarily assign a particular process to a desired button. When the user intends to execute one of a process assigned to the plurality of buttons, the user selects a tab in which a button assigned with the particular process is arranged so that the button assigned with the particular process is displayed. Then, by operating the button, the particular process can be executed.

A device employing the tabbed-multiscreen form standby screen as mentioned above could be used as follows. An administrator may assign the tabs to individual persons or groups, and on screens corresponding to respective tabs, buttons assigned with particular processes are arranged.

There could be a case where a particular process is to be assigned not only to an individual person or a group, but to a plurality of persons or groups. In such a case, for example, the administrator may assign the process to each of the plurality of tabs. Then, the users corresponding to the respective tabs can execute such a process. However, such a configuration requires the administrator for a troublesome assigning operation.

In contrast, according to another usage type, the particular process may be assigned to a button arranged on a screen corresponding to a particular tab. According to such a configuration, when a user wishes to execute the particular process, the user may select the particular tab whenever the process is to be executed. According to such a configuration, however, the user is required to switch to the particular tab whenever the particular process is to be executed. Thus, such a configuration is inconvenient for the user.

In consideration of the above, the present disclosures provide an improved display controlling device, an improved display controlling method, and a non-transitory computer-readable recording medium storing instruction therefor, which enable the user to select and execute the particular process efficiently.

According to aspects of the present disclosures, there is provided a display control device provided with a display, an input device and a controller. The controller is configured to execute causing the display control device to display a plurality of tabs, and a tab screen corresponding to one of the plurality of tabs in a selected state from among a plurality of tab screens respectively corresponding to the plurality of tabs, a plurality of icons being arrangeable in each of the plurality of tab screens, the plurality of icons including a particular icon assigned with a particular process, receiving, through the input device, a particular selecting operation to select, from among the plurality of tab screens, two or more tab screens to which particular common areas are set, setting the common area to each of the common tab screens as the two or more tab screens selected in accordance with the particular selecting operation, receiving, through the input device, a particular arranged operation to arrange the particular icons with respect to the common area in the common tab screen currently displayed when the common tab screen is displayed on the display, and arranging the particular icons assigned with the particular processes to the common areas of all the common tab screens based on the arranging operation.

According to aspects of the present disclosures, there is provided a display control method employed in a display control device provided with a display and an input device. The method includes causing the display control device to display a plurality of tabs, and a tab screen corresponding to one of the plurality of tabs in a selected state from among a plurality of tab screens respectively corresponding to the plurality of tabs, a plurality of icons being arrangeable in each of the plurality of tab screens, the plurality of icons including a particular icon assigned with a particular process, receiving, through the input device, a particular selecting operation to select, from among the plurality of tab screens, two or more tab screens to which particular common areas are set, setting the common area to each of the common tab screens as the two or more tab screens selected in accordance with the particular selecting operation, receiving, through the input device, a particular arranged operation to arrange the particular icons with respect to the common area in the common tab screen currently displayed when the common tab screen is displayed on the display, and arranging the particular icons assigned with the particular processes to the common areas of all the common tab screens based on the arranging operation.

According to aspects of the present disclosures, there is provided a non-transitory computer-readable medium containing instructions to be executed by a controller of a display control device having a display, an input device and the controller. The instructions cause, when executed by the controller, the display control device to execute displaying a plurality of tabs, and a tab screen corresponding to one of the plurality of tabs in a selected state from among a plurality of tab screens respectively corresponding to the plurality of tabs, a plurality of icons being displayed in each of the tab screens, the plurality of icons including a particular icon to which a particular process is assigned, receiving, through the input device, a particular selecting operation to select, from among the plurality of tab screens, two or more tab screens to which particular common areas are set, setting the common area to each of the common tab screens as the two or more tab screens selected in accordance with the particular selecting operation, receiving, through the input device, a particular arranged operation to arrange the particular icons with respect to the common area in the common tab screen currently displayed when the common tab screen is displayed on the display, and arranging the particular icons assigned with the particular processes to the common areas of all the common tab screens based on the arranging operation.

BRIEF DESCRIPTION OF THE ACCOMPANYING DRAWINGS

FIGS. 3A, 3B and 3C illustrate a standby screen according to the illustrative embodiment.

FIGS. 4A-4D show examples of registration of icons on a standby edit screen according to the illustrative embodiment.

FIGS. 5A-5D show examples of deletion of icons in a common area according to the illustrative embodiment.

DETAILED DESCRIPTION OF THE EMBODIMENTS

Hereinafter, referring to the accompanying drawings, illustrative embodiments of the present disclosures will be described.

1. Illustrative Embodiment (1-1) Configuration of Image Processing Device

Figure 1:
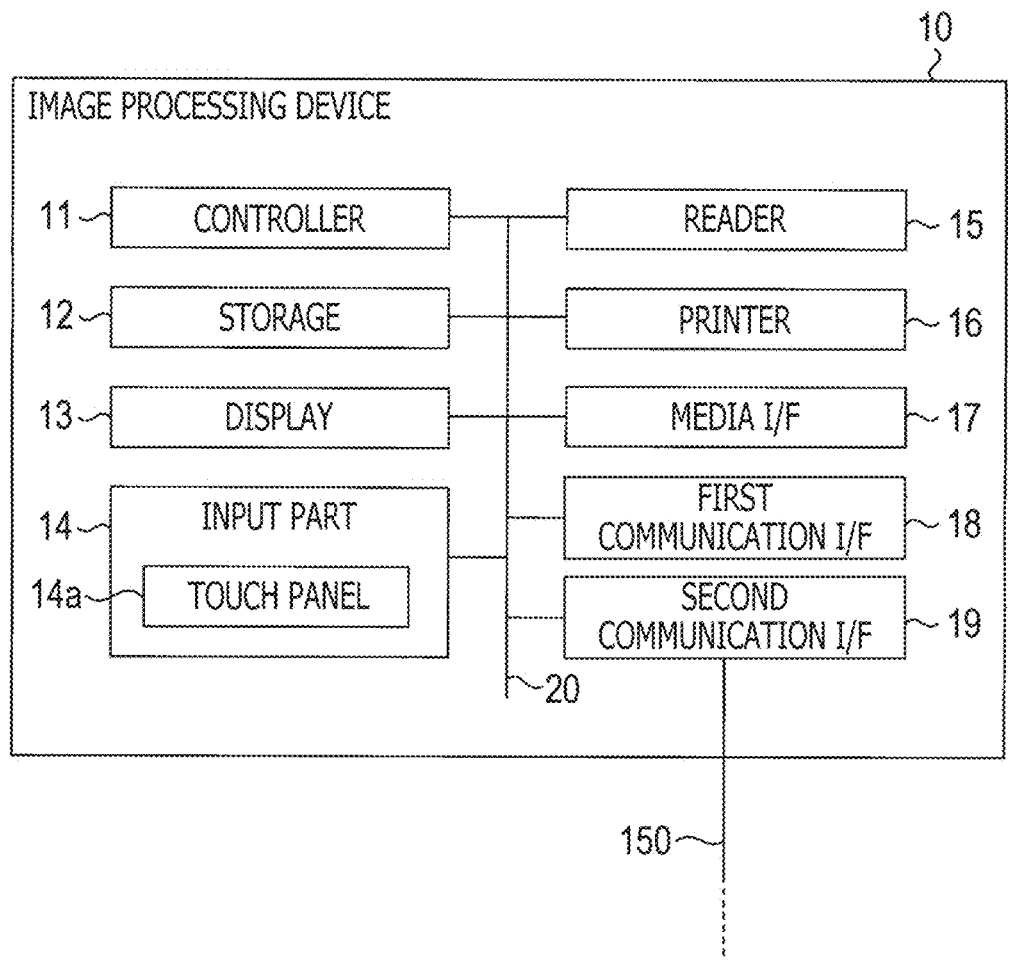
FIG. 1 is a block diagram showing a functional configuration of an image processing device according to an illustrative embodiment of the disclosures.

An image processing device 10 according to an illustrative embodiment shown in FIG. 1 has multiple functions including a scanning function to read an image on an original and generate image data representing the read image, a print function to print an image on a printing sheet, a copying function to print an image read by the scanning function onto the printing sheet by the print function, and a facsimile function to transmit/receive facsimile data.

The image processing apparatus 10 has, as shown in FIG. 1, a controller 11, a storage 12, a display 13, an input part 14, an image reader 15, a printer 16, a media I/F 17, a first communication I/F 18 and a second communication I/F 19, which are interconnected via a bus 20.

The controller 11 has a CPU. The storage 12 includes semiconductor memories such as a ROM, a RAM, an NVRAM, a flash memory and the like. It could be said that the image forming device 10 is provide with a microcomputer including the CPU and semiconductor memories.

The controller 11 realizes various functions by executing programs stored in a non-transitory recording medium. According to the illustrative embodiment, the storage 12 is an example of the non-transitory recording medium storing the programs, or computer executable instructions. It is noted that the various functions, which are realized by the controller 11 according to the illustrative embodiment, are not necessarily be realized by execution of the programs. A part of or all of the functions may be realized with used of a plurality of hardware.

The storage 12 stores data of various screens, including the standby screen 25 (see FIG. 2), to be displayed on the display 13. Further, the storage 12 also stores the programs for a main control process (see FIGS. 5-7) and an arranged area changing process (see FIGS. 9A and 9B). The programs realizing the respective functions described above may be included in the program of the main control process, or provided as separate programs.

The display 13 has a device configured to display an image such as a liquid crystal display or an organic EL display. The input part 14 has an input device through which various input operations of a user are acquired. The input device which the input part 14 has includes a power button 5 (see FIG. 2), a numeric keypad 6, a return button 7, a home button 8, a stop button 9 and a touch panel 14a. The touch panel 14a is arranged on an image display area of the display device of the display 13.

The touch panel 14a is configured to detect a designating operation by contact or proximity of a designation body onto an image display area of the display 13. The touch panel 14a is configured such that, when an instruction operation using the designating body is performed on the image display area of the display 13, the touch panel 14a outputs position information indicating a position at which the designating body is located. According to the illustrative embodiment, that touch panel 14a continuously or periodically outputs the position information when the designating operation with use of the designating body is being performed. It is noted that the touch panel 14a may be configured to detect, as the designating operation, only a contact of the designating body, only proximity of the designation body, or both the contact and proximity of the designating body.

The controller 11 obtains the position information output by the touch panel 14a, and based on the obtained position information, presence/absence of the designating operation of the designating body, the designated position when the designating operation is performed, and at least one particular operation by the designating body when the designating operation is performed.

The operations the controller 11 can detect include at least a tap operation which is an operation of releasing the designating body at the same position where the designating operation with use of the designating body is performed. Various concrete aspects of the designating body used to perform the designating operations can be considered. For example, the designating body may be a tip of a finger, or a particular designating device such as a stylus pen.

The image reader 15 has an image sensor, and configured to read an image on the original and generates image data representing the read image. Optionally, the image reader is provided with an ADF (automatic document feeder). Further optionally, the image reader 15 may be configured to execute a double-sided scanning to read images on both sides of the original set to the platen or the ADF.

The printer 16 has a printing mechanism for printing an image on a printing sheet in accordance with an inkjet printing method or an electrophotographic printing method. Optionally, the printer 16 may be configured to perform a double-sided printing to print images on both sides of the printing sheet.

The media I/F 17 is an interface to which various recoding media such as a USB flash memory are coupled. The media I/F 17 controls reading and writing of data with respect to the recording medium coupled thereto.

The first communication I/F 18 is a communication interface functioning to connect the image processing device 10 to a network for data communication. The first communication I/F 18 may be configured to be connectable with at least one of various types of networks such as a wired LAN, a wireless LAN or the Internet. Optionally, the image processing device 10 may be configured to execute a data communication with various information processing devices such as a personal computer, a smartphone, a tablet terminal and the like through the first communication I/F 18, with or without wires. Further optionally, the image processing device 10 may be configured to be connected to the Internet through the first communication I/F 18 and may execute the data communication with various servers and/or information processing devices through the Internet.

The second communication I/F 19 is an interface for communicating with external equipment through a communication line 100. The communication line 100 connected to the second communication I/F 19 is, according to the illustrative embodiment, for example, a public telephone network. Transmission/reception of facsimile data by the facsimile function is executed basically through the second communication I/F 19.

(1-2) Configuration of Operation Panel

Figure 2:
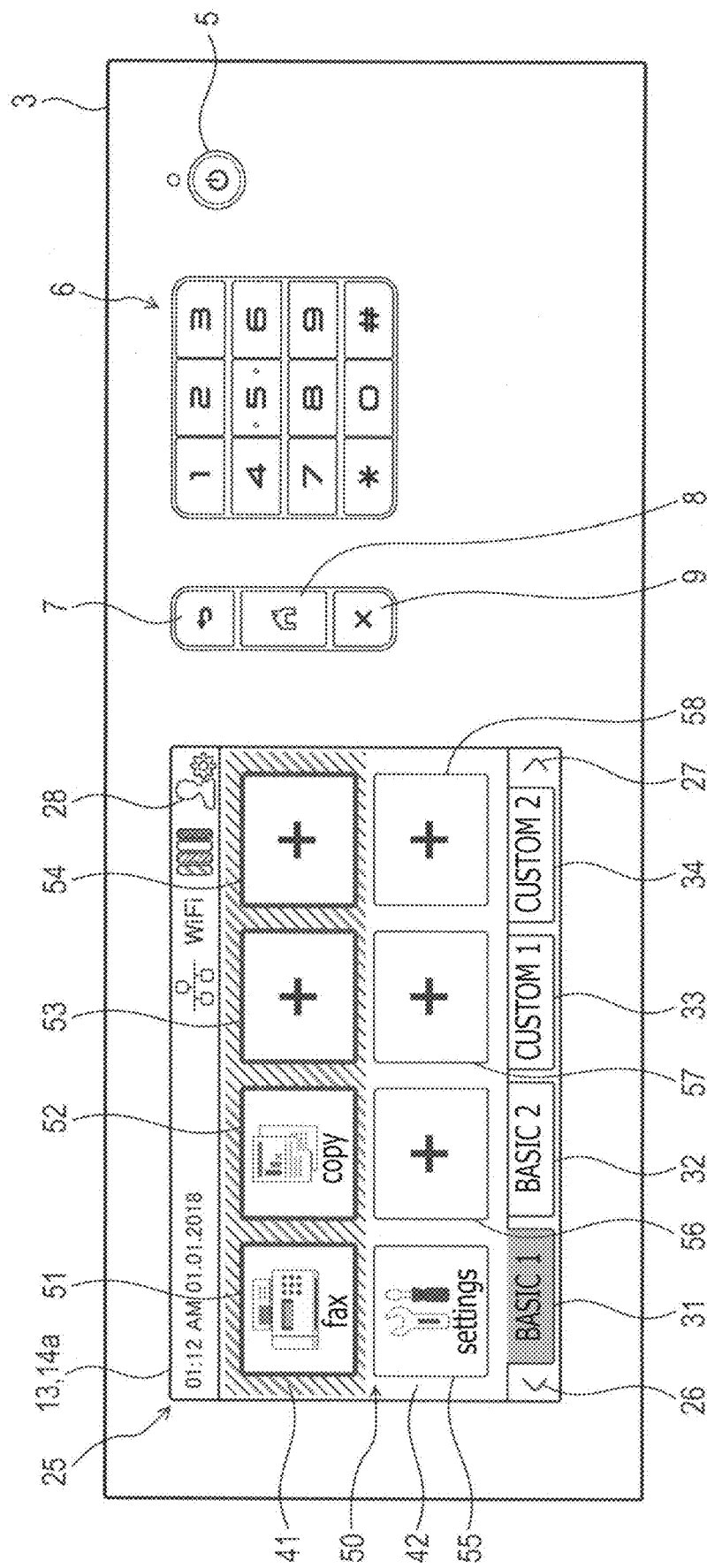
FIG. 2 shows an operation panel of the image processing device according to the illustrative embodiment of the disclosures.

On one side surface of a housing (not shown) of the image processing device 10, an operation panel 3 is proved as shown in FIG. 2. On the operation panel 3, a power button 5, a numeric keypad 6, a return button 7, a home button 8, a stop button 9, a display 13 and a touch panel 14a. It is noted that the display 13 shown in FIG. 2 is configured such that a displaying device provided to the display 13 has an image display area. The touch panel 14a is arranged to overlaid on almost entire range of the image display area.

The power button 5 is a hard key operated by the user to turn ON/OFF the power of the image processing device 10. When the power button 5 is depressed, the power is supplied to the image processing device 10 and the image processing device 10 start operating, the controller 11 executes a particular initialization process, and then displays a standby screen 25 on the display 13. By performing input operations with the standby screen 25 as a starting point, the user can switch the screens displayed on the display 13, make various settings, and cause the image processing device 10 to execute various functions.

The numeric keypad 6 is a collective name of multiple hard keys including number keys of "0"-"9" which are operated by the user mainly when numbers are input when, for example, a destination facsimile number of facsimile data is input or the number of copies is input when the copying function is used.

The return button 7 is a hard key which is operated by the user when the user wishes to return the screen currently displayed on the display 13 to a screen immediately before switched to the current screen. The home button 18 is a hard key to be operated by the user when the user wishes to display the standby screen 25 on the display 13. The stop button 9 is a hard key operated by the user when the user wants to stop the currently executed operation.

(1-3) Description on Standby Screen

The standby screen 25 is a so-called tabbed-multiscreen form standby screen which includes a plurality of tabs. The tabs are associated with tab screens, respectively. On the standby screen 25, a tab screen corresponding to one tab which is currently in a selected state is displayed. Information necessary to display the standby screen 25, and information regarding processes to be executed when input operations with respect to the standby screen are performed through the input part 14 are stored in the storage 12.

As shown in FIG. 2, utmost four tabs can be displayed on the standby screen 25. It is noted that, according to the illustrative embodiment, the total number Nt of the tabs is greater than four which is the number of the tabs that can be displayed on the standby screen 25 simultaneously. FIG. 2 shows a state where a first tab 31, a second tab 32, a third tab 33 and a fourth tab 34 are displayed, among the first to Nt-th tabs, on the standby screen 25.

On each tab, a name assigned to the tab is indicated. Further, a tab being in a selected state is displayed in a mode different from the other tabs. For example, the selected tab and the other tabs are displayed such that the selected tab has a color different from the color of the other tabs, the selected tab is larger than the other tabs, or only the selected tab may be decorated. FIG. 2 shows an example in which the first tab 31 of which name is "BASIC 1" (representing a basic function 1) is selected, and has a color different from the color of the other tabs (i.e., the second, third and fourth tabs 32, 33 and 34).

The first to Nt-th tabs are respectively associated with tab screens (i.e., first to Nt-th tab screens). On the standby screen 25, a tab screen corresponding to the tab in the selected state is displayed. In the example shown in FIG. 2, the first tab 31 is in the selected state, and a first tab screen 50 associated with the first tab 31 is displayed.

Each tab screen is configured such that a plurality of icons are arranged thereon. According to the example shown in FIG. 2, eight icons (first to eighth icons 51-58) are arranged on the tab screen 50. Each icon displayed on the tab screen 50 can be changed as will be described later.

According to the example shown in FIG. 2, the first icon 51 is a fax icon, the second icon 52 is a copy icon, the fifth icon 55 is a setting menu icon, and the third icon 53, the fourth icon 54 and the sixth icon 56 are unregistered icons to which no functions are assigned.

In the vicinities of both ends of the tab display area, in the standby screen 25, a right button 27 and a left button 26 are displayed. It is noted that an arranging order in the right-left direction of Nt tabs is determined in advance. When there exists another tab on the left side of the currently displayed four tabs, by tapping the left button 26, the currently displayed four tabs are scrolled rightward, thereby the tab on the left side with respect to the 1st tab 31 will be displayed in the tab display area 30. In contrast, the rightmost tab (i.e., the 4th tab 34) of the currently displayed four tabs will disappear as they are scrolled rightward. Similarly, when there exists a tab on the right side with respect to the currently displayed four tabs, by tapping the right button 27 to scroll the currently displayed four tabs leftward, the tab arranged on the right side with respect to the 4th tab 34 will be displayed within the tab display area 30, while the leftmost tab 31 will disappear when the four tabs are scrolled leftward.

When the tab screen corresponding to the currently selected tab is switched to another tab screen corresponding to anther tab, another should be tapped. When one of the tabs other than the currently selected tab is tapped, the tapped tab is in the selected state, and on the standby screen 25, the tab screen corresponding to the tab newly set to the selected state is displayed.

It is assumed, for example, that the first tab screen corresponding to the first tab 31 is displayed on the standby screen 25 as shown in FIG. 3A. In such a state, in response to the second tab 32 on which "BASIC 2" is displayed being tapped, the tab in the selected state is switched from the first tab 31 to the second tab 32 as shown in FIG. 3B, and thereafter, a second tab screen 60 associated with the second tab 32 is displayed instead of the first tab screen 50.

On the second tab screen 60, eight icons (i.e., first icon 61 through eighth icon 68) are displayed. On the second tab screen 60, the first icon 61 is the fax icon whish the same icon as the first icon 51 on the first tab screen 50, and a second icon 62 is a copy icon which is the same icon as the second icon 52 on the first tab screen 50. The third icon 63 through the eighth icon 68 are unregistered icons.

When, for example, in a state where the second tab screen 60, which corresponds to the second tab 32, is displayed, if the user taps the fourth tab 34, of which tab name is "CUSTOM 2", the selected tab is switched from the second tab 32 to the fourth tab 34 as shown in FIGS. 3A-3C. After the selected tab has been switched to the fourth tab 34, a fourth tab screen 70 corresponding to the fourth tab 34 is displayed.

On the fourth tab screen 70, eight icons (i.e., first icon 71 through eighth icon 78) are displayed. On the fourth tab 70, the first icon 71 is the shortcut icon, and the second through eighth icons 72-78 are unregistered icons.

To each icon arranged on each tab screen, a particular process is assigned. When the user taps one of the icons, the particular process assigned to the tapped icon is executed.

The icons displayed in the tab screen of the standby screen 25 includes, when generally categorized, three kinds of icons. Specifically, the three kinds of icons are function execution icons, setting icons, and unregistered icons. The function execution icons are icons to which functions, among the multiple functions the image processing device 10 has, to be executed are assigned, respectively. That is, to the function execution icons, particular processes to respectively realize registered functions are assigned. When one of the function execution icons is tapped, the particular process assigned to the tapped icon is executed, thereby the registered function being realized.

The setting icons are icons to which a particular item subjected to be set, or lists of multiple icons subjected to be set are assigned. That is, to the setting icons, particular processes to respectively realize setting items are assigned. When one of the setting icons is tapped, the particular process assigned to the tapped icon is executed, thereby the setting of setting item being realized.

The unregistered icons are icons to which no functions or setting items are assigned, and user's desired functions or setting items can be newly and arbitrarily assigned thereto. To each of the unregistered icons, a particular process associated with a user input operation to newly register the function execution icon for an arbitrary function, or newly register the setting icon for an arbitrary setting item is assigned. Thus, when the unregistered icon is tapped, the particular process assigned to the unregistered icon is executed, thereby registration of the new function execution icon or the setting icon being realized.

The function execution icons are further categorized in tow kinds of icons: specific function icons; and shortcut icons. The specific function icons are icons for executing functions the image processing device 10 has (i.e., the scanning function, the print function, the copying function, the facsimile function, web service functions, convenient tool functions and the like), respectively, and the function subjected to be executed is assigned to each specific function icon. The specific function icons have been registered, in advance, as the factory default setting. Setting values assigned to the respective specific function icons are default values preliminarily set. It is noted that the user can confirm and/or change such a default value when the user taps the specific function icon to execute the assigned specific function.

To each of the shortcut icons, a shortcut to execute any of the specific functions in accordance with a particular execution condition the user set in advance can be assigned. At a time of shipment of the image processing device 10, at least one icon may be preliminarily arranged on each tab screen, the at least one icon being at least one of the specific function icon or the setting icon.

The shortcut icons are, basically, not preliminarily registered as the factory default setting of the image processing device 10. The shortcut icon is arranged when the user executes a registration operation to assign a shortcut with respect to an unregistered icon. It is noted that at least one shortcut icon may be arranged on at least one tab screen when the image processing device 10 is arranged in advance.

It is noted that, regarding the specific function icons, the initial values for respective setting items have been preliminarily determined. In contrast, regarding the shortcut icons, the user can register the function subjected to be executed, with setting conditions to execute the functions, arbitrarily.

It is noted that, the unregistered icons can be registered as a shortcut icon by assigning an arbitrary shortcut function thereto. Further, the unregistered icons can be registered as the specific function icons by assigning desired functions and/or registered as the setting icons by assigning desired setting items.

In the first tab screen 50 shown in FIG. 2 and the FIG. 3A, the fax icon arranged as the first icon 51 is the specific function icon to execute the facsimile function. The copy icon arranged as the second icon 52 is the specific function icon to execute the copying function. the setting menu icon arranged as the fifth icon 55 is the setting icon to set the setting value of at least one kind of setting item. In the fourth tab screen 70 shown in FIG. 3, the first icon 71 is a shortcut icon to which a shortcut function to execute the facsimile function in accordance with a particular setting condition.

Further, the scan icons arranged as third icons 53 and 63 in the first tab screen 50 and the second tab screen 60 shown in FIGS. 4C and 4D are the specific function icons to execute the scanning function. It is noted that the two scan icons are the same icons and assigned with the same particular process.

In the first tab screen 50 shown in FIG. 4C, the icon arranged as the eighth icon 58 is a shortcut icon to which a shortcut function of scan-to-file is assigned. The scan-to-file function is one of concrete modes of the scanning function.

Regarding the shortcut function, as described above, the user can arbitrarily assign the shortcut function to the unregistered icon. Examples of the functions which can be assigned to the unregistered icons as the shortcut function include, for example, the above-described specific function, namely, the facsimile function, the copying function, the scanning function, the web service function and a convenient tool function.

For example, when the user wishes to assign the shortcut function of the copying function, firstly the user taps the unregistered icon included in the tab screen associated to any one of the tabs. When the user taps the unregistered icon, a list of functions and setting items which can be assigned to the unregistered icon is displayed. Then, the user can select, from the list, the function or the setting item to be assigned to the unregistered icon.

When any one of the setting items is selected, a setting icon corresponding to the selected setting item is newly registered. That is, the unregistered icon subject to the registration is changed to the setting icon assigned with the particular process in accordance with the selected setting item. Thereafter, when the user taps the setting icon, the particular process assigned to the setting icon is executed. Then, the user can check and/or change the setting values of the setting items assigned to the setting icon.

After the unregistered icon is tapped and one of the functions is selected from the list, a selection screen allowing the user to select whether the function is registered as the specific function icon or the shortcut icon is displayed.

When registration as the specific function icon is selected, the specific function icon corresponding to the selected function is newly registered. That is, the unregistered icon subject to the registration is registered as the specific function icon assigned with the particular process in accordance with the selected function.

According to the present embodiment, it is possible to arrange a plurality of icons assigned with the same particular process in one tab screen or in a plurality of tab screens. When there is a specific function icon or a setting icon which is arranged at the time of the shipment, the user can arrange the icon same as the icon arranged at the shipment in addition to the same.

When registration of the shortcut function is selected, a setting screen encouraging the user to select on what execution condition the selected function is to be executed. The user can arbitrarily set the setting values of respective setting items necessary to cause the selected function to be executed (i.e., the execution condition) through the setting screen. When an operation of indicating completion of the setting, the shortcut icon executing the selected function in accordance with the particular execution condition is generated. That is, the unregistered icon subject to the registration is registered as the shortcut icon to which the particular process in accordance with the execution condition. Thereafter, when the user taps the shortcut icon, the particular process assigned to this shortcut icon is executed, and the registered function can be executed easily in accordance with the registered particular execution condition.

(1-4) Description of Management Function

As shown in FIGS. 2, 3A and 3B, on the standby screen 25, an administrator button 28 (hereinafter, also referred to as ADMIN button 28) is displayed. The ADMIN button 28 is tapped, an authentication screen for the administrator is displayed. When the user (i.e., the administrator) inputs necessary information (e.g., a password), an authentication process is executed.

The authentication process is to determine whether particular authentication conditions have been fulfilled. The authentication conditions include a condition that an input password coincides with a legitimate password which has preliminarily been registered. As a result of the authentication process, if the authentication conditions are fulfilled, the operation mode is switched to the administrator mode, and a standby editing screen 90 as shown in FIG. 4A is displayed on the display 13. It is noted that the standby editing screen 90 is a screen on which new registration, release of registration, edition of registered contents with respect each of the icons arranged on each tab screen can be performed.

On the standby editing screen 90, as shown in FIGS. 4A and 4B, a plurality of tabs and a tab screen corresponding to the tab in the selected state are displayed as in the standby screen 25. The plurality of tabs and the contents of the tab screen displayed on the standby editing screen 90 are basically the same as those of the standby screen 25. Further, a configuration that the contents of the tab screen can be changed by switching the selection state of the plurality of tabs is the same as that of the standby screen 25.

On the standby editing screen 90, as shown in FIGS. 4A and 4B, icon editing buttons for respective kinds of editing operations for executing editing operations targeting part of or all of the icons included in each tab screen as processed targets are displayed. Specifically, according to the present embodiment, as the icon editing buttons, a left movement button 81, a right movement button 82, a swapping button 83, a deletion button 84 a batch deletion button 85 are displayed.

The batch deletion button 85 is a button to release the registered states of all the icons arranged on the tab screens corresponding to all the tabs and to switch the states of all the icons to the unregistered state. The deletion button 84 is a button to release the registered states of the selected icons (except for the unregistered icons) and to switch the sates of the selected icons to the unregistered state. It is noted that, in the following description, an expression of "deleting" the arranged icons means "releasing" of the registered state of the icon and make the icon be in the unregistered state.

The swapping button 83 is to swap positions of two icons. The right movement button 82 is to shift an icon to a right side thereof. The left movement button 81 is to shift an icon to a left side thereof.

When the standby screen 25 is displayed after performing the operations as above (i.e., new registration, editing, deleting, moving and/or swapping of the icons) in the standby editing screen 90, the operations performed with respect to the standby editing screen 90 have been reflected on the standby screen 25.

(1-5) Description on Areas Defined in Tab Screens

As shown in FIGS. 2 and 3, in each tab screen, a common area 41 and an individual area 42 are defined. Further, to each of two tab screens among the tab screens, an common area 41, which is different from the individual area 42, can be defined.

The user can arbitrarily determine to which one of the tab screens, the common area 41 is set. For example, the user can set the common areas 41 to all of the Nt tab screens, respectively. For another example, the user can select arbitrary two or more tab screens from among the Nt tab screens, and set the common areas 41 to the selected tab screens, respectively.

In the following description, it is assumed that the common areas 41 is set at least to the first tab screen 50 and the second tab screen 60, respectively, among the Nt tab screens. FIGS. 3A-3C show that the common areas 41 are set to the first tab screen 50 and the second tab screen 60, while the common area 41 is not set to the fourth tab screen 70.

On the tab screen in which the common area 41 is defined, user can arbitrarily determine a location of the common area within the tab screen. For example, only a partial area of the entire area of the tab screen may be defined as the common area 41, or the entire area of the tab screen may be determined as the common area 41. When only a partial area of the tab screen is defined as the common area 41, the remaining area (i.e., the area other than the common area 41) is defined as the individual area 42. When the entire area of the tab screen is defined as the common area 41, the tab screen having such a common area 41 does not have the individual area 42.

According to the illustrative embodiment, the setting of the area of the common area 41 can be made, for example, by a unit of icon. That is, when the user selects at least one icon to be set as an icon arranged in the common area 41 from among a plurality of icons to be arranged on the tab screen, a particular area including the selected icon(s) is set as the common area 41. Further, an area including the icons which are not selected is set as the individual area 42. It is noted that a method of setting (defining) the common area 41 (or the individual area 42) by the unit of icon(s) is only an example of an area determining method.

According to the present embodiment, as an example, it is assumed that the upper half of the tab screen in which the first icon—fourth icon among the eight icons are arranged is defined as the common area 41, and the lower half of the tab screen in which the fifth icon—eighth icon are arranged is defined as the individual area 42.

In the following description, the tab screen on which the common area 41 is defined will occasionally be referred to as a common tab screen, and the tab of the common tab screen will occasionally be referred to as a common tab.

The four icons arranged in the common area 41 are the same in all the tab screens. That is, even if the selected tab is switched to another and the displayed tab screen is switched, the icons arranged in the common area 41 are unchanged.

According to the illustrative embodiment, in a state where one of the tab screens is displayed, if a function execution icon or a setting icon is newly arranged in the common area 41 of the displayed tab screen, the icon is arranged not only in the currently displayed tab screen, but the same icon is arranged in the common area 41 of each of the other tab screens.

Further, according to the illustrative embodiment, in a state where one of the tab screens is displayed, if any one of the icons arranged in the common area 41 of the displayed tab screen is deleted, the icon is removed from the currently displayed tab screen, and further, the same icon arranged at the same position in the common area 41 of each of the other tab screens is also deleted.

Further, according to the illustrative embodiment, in a state where one of the tab screens is displayed, if an editing operation is applied to any one of the icons arranged in the common area 41 of the displayed tab screen, the registered content regarding the icon is updated in the currently displayed tab screen, and further, the registration content of the same icon arranged at the same position in the common area 41 of each of the other tab screens is also updated.

As above, the operations (i.e., registration, edition, movement, deletion and the like) applied to an icon arranged in the common area 41 of the tab screen currently displayed is reflected not only to the icon arranged in the common area 41 of the currently displayed tab screen, but to the icon arranged at the same position in the common area 41 of the other tab screen. Thus, the icons arranged in the common area 41 in one tab screen are the same as the icons arranged in the common area 41 of any other one of the tab screens.

For example, it is assumed that, in a state where the first tab screen 50 is displayed such that the standby editing screen 90 (see FIG. 4A) is displayed, the third icon 53, which is the unregistered icon in the common area 41, is changed to the specific function icon associated with the scanning function. In such a case, as shown in FIG. 4C, the third icon 53 in the first tab screen 50 is changed to the specific function icon. Further, the icon located at the same position in the common area 41 in each of the other tab screens, as well as the second tab screen 60, is changed to the specific function icon associated with the same function.

Incidentally, when one of the tab screens is displayed and an operation (e.g., registration, deletion, edition and the like) is applied to an icon arranged in the individual area 42 of the currently displayed tab screen, the operation is reflected only to the icon in the currently displayed tab screen, and will not be applied to the icons included in the other tab screens.

For example, it is assumed that a shortcut icon for a scan-to-file is newly assigned to the eighth icon 58, which is the unregistered icon within the individual area 42, in a state where the standby editing screen 90 shown FIG. 4B is displayed, that is, in a state where the first tab screen 50 is displayed. In such a case, as shown in FIG. 4C, the eighth icon 58 in the first tab screen 50 which is currently displayed is registered as the shortcut icon. However, the icons located at the same position in the individual area 42 of the other tab screens including the tab screen 60 will remain unchanged (see FIG. 4D).

When the operation mode is the administrator mode, each operation of the new registration, deletion, movement, editing and the like can be performed with respect to any one of the icons arranged within the common area 41 and the individual area 42. In contrast, when the operation mode is a general mode, which is not the administrator mode, the new registration and editing of the icon are allowed in the individual area 42, but not allowed in the common area 41. Further, when the operation mode is the general mode, deletion, movement, swapping of the icons in the common area 41 are not allowed. In other words, the deletion, movement, swapping of the icons in the common area 41 are allowed on the standby editing screen 90 (see FIG. 4A) which can be displayed when the operation mode is the administrator mode. When the operation mode is the general mode, regarding the icons within the individual area 42, deletion of the shortcut icons is allowed but deletion, movement, and swapping of the icons other than the shortcut icons are not allowed. Deletion, movement and swapping of the icons within the individual are 42 are allowed when the operation mode is the administrator mode.

It is noted that, in each of the administrator mode and the general mode, whether the new registration, editing, movement, swapping and the like of the icons are allowed or not in each of the areas 41 and 42 may be determined arbitrarily.

(1-6) Switching of Enabled/Disabled State of Common Area Setting

The image forming device 10 according to the present embodiment is configured such that the user arbitrarily determine whether the common areas 41 are defined on the tab screens. Specifically, in a common area setting screen 100 shown in FIG. 9, the user can enable/disable the setting of the common area 41. When the common area setting is disabled, the common area 41 is deleted from each of the tab screens, thereby all the tab screens having only the individual areas 42, respectively. When the common area setting is enabled, the user is allowed to select a plurality of tab screens and set (i.e., define) the common areas 41 on the selected tab screens, respectively.

In a state where the common areas 41 are set in both the first tab screen 50 and the second tab screen 60 as shown in FIGS. 5A and 5B, if the common area setting is disabled, the common areas 41 are deleted from the common tab screens 50 and 60, and only the individual areas 42 remain on the tab screens 50 and 60, respectively.

When the common area setting is switched from the enabled state to the disabled state, if there exist icons (hereinafter, occasionally referred to as registered icons) other than the unregistered icons, the user can determine how the registered icons in the common area 41 are to be treated.

Concretely, the user can select "delete all" option, "remain all" option or "remain partially" option as treating of the icons arranged in the common area 41 before disabled.

"Deletion" is an operation of releasing registrations of the registered icons arranged in the common areas 41 of all the common tab screens, and changing the same to the unregistered icons. "Remain All" is an operation of maintaining the registered states of all the registered icons arranged in the common areas 41 of all the common tab screens.

"Maintain Partially" is an operation of maintaining the registered states of the registered icons arranged in the common area 41 of one or more particular common tab screen from among all the common tab screens, and releasing registration of the registered icons arranged in the common area(s) 41 of the other common tab screen(s). When the user selects the "maintain partially", the user is allowed to arbitrarily select one or more common tab screens on which the registered icons in the common areas 41 are maintained.

FIGS. 5C-5D show an exemplary case in which, when the common area setting is enabled for the first tab screen 50 and the second tab screen 60, the common area setting is switched to be disabled. In this example, the "maintain partially" method is selected as the treating method of the registered icons in the common areas 41 and the first tab screen 50 is selected as the tab screen on which the registered icons are maintained.

Regarding the first tab screen 50, as shown in FIG. 5C, the two registered icons 51 and 52, which were arranged in the common area 41 before the common area setting is disabled (see FIG. 5A) are still arranged on the tab screen 50 as there were after the common area setting is disabled. Incidentally, regarding the second tab screen 60, as shown in FIG. 5D, the two registered icons 61 and 62, which were arranged in the common area 41 before the common area setting is disabled (see FIG. 5A) are deleted (i.e., changed to the unregistered icons 61 and 62). It is noted that, in FIGS. 5C and 5D, since the common area setting has been disabled, the entire area of the tab screens 50 and 60 are individual areas 42.

When the common area setting is switched from the disabled state to the enabled state, when the registered icons are arranged within an area which will be set as the common area 41, the user is allowed to determine how the registered icons will be treated after the common area setting is enabled. Specifically, the user is allowed to delete the registered icons existing within an area which will be set as the common area 41. Alternatively, the user is allowed to arrange a part of or all of the icons arranged within an area which will be set as the common area 41 the individual areas 42 of user-desired one or more tab screens.

(1-7) Main Control Process

Hereinafter, referring to FIGS. 6A-8B a main control process executed by the controller 11 to realize the various functions mentioned above, will be described. When the power button is depressed and the electric power is supplied to the controller 11, a main control process shown in FIGS. 6A-8B will be described.

When the main control process (FIGS. 6A-8B) is started, the controller 11 displays a standby screen 25 on the display 13 (S110). It is noted that an initial value of the tab screen, that is settings of a firstly displayed tab screen displayed on the standby screen 25 immediately after the main control process is started, a tab screen to be displayed on the standby screen after completion of function execution, and a tab screen displayed on the standby screen 25 when a home button 8 is depressed may be determined arbitrarily. According to the illustrative embodiment, the above tab screens are the first tab screen 50.

In S120, the controller 11 determines whether the ADMIN button 28 in the standby screen 25 is tapped. When the controller 11 determines that the ADMIN button 28 has not been tapped (S120: NO), the controller 11 determines whether one of the plurality of tabs displayed on the standby screen 25 has been tapped in S130. When the controller 11 determines that one of the plurality of tabs has been tapped (S130: YES), the controller 11 executes the tab switching process in S140. Specifically, in S140, the controller 11 makes the tapped tab in a selected state, and displays the tab screen assigned to the tapped tab. After the controller 11 switched that tab screen in S140, the controller 11 returns process to S110.

When the controller 11 determines that none of the tabs is tapped (S130: NO), the controller 11 advances process to S150. In S150, the controller 11 determines whether a registered icon has been tapped. When the controller 11 determines that the registered icon has been tapped (S150: YES), the controller 11 proceeds to S160. In S160, the controller 11 executes a particular process assigned to the tapped icon. According to the above configuration, the function or the setting assigned to the icon is realized. After execution of S160, the controller 11 returns to S110.

When the controller 11 determines that a registered icon has not been tapped (S150: NO), the controller 11 proceeds to S170. In S170, the controller 11 determines whether registration of a new icon is applied to a unregistered icon is instructed. The instruction of registration of the new icon includes, for example, an tapping operation of an unregistered icon. When the controller 11 determines that registration of the new icon is instructed (S170: YES), the controller 11 proceeds to S180.

In S180, the controller 11 determines whether the unregistered icon to which the registration instruction has been applied is arranged in the common area 41. When the registration instruction is applied to the unregistered icon arranged within the common area 41 (S180: YES), the controller 11 proceeds to S190, executes an error process and returns to S110. The error process in S190 is a process of notifying the user that the new registration of the icon in the common area 41 cannot be performed in the current mode (i.e., the general mode).

When the registration instruction is applied to the unregistered icon arranged in the individual area 42 (S180: NO), the controller 11 proceeds to S200. In S200, the controller 11 obtains registration information through the user input operation. The registration information is information indicating concrete contents such as s function and/or setting items subject to the new registration. In S210, the controller 11 newly registers an icon based on the registration information obtained in S200. Then, the unregistered icon to which the registration instruction is applied is switched to the icon assigned with the particular process based on the registration information obtained in S200. After newly registering the icon in S210, the controller 11 returns to S110.

When the controller 11 determines that the registration of the new icon has not been instructed (S170: NO), the controller 11 proceeds to S210. In S210, the controller 11 determines whether editing instruction has been applied to a registered icon. The editing instruction includes, for example, a long press of the target icon. The long press is an operation to be executed after an instruction operation is executed to cancel the instruction operation by depressing an operation target for a particular period or more through the touch panel 14a.

When the controller 11 determines that the editing instruction has not been applied to a registered icon (S210: NO), the controller 11 returns to S110. When the controller 11 determines that the editing instruction has been applied to a registered icon (S210: YES), the controller 11 proceeds to S220.

In S220, the controller 11 determines whether the icon to which the editing instruction is applied is arranged in the common area 41. When the controller 11 determines that the editing instruction is applied to the icon arranged in the common area 41, the controller 11 executes an error process (S230), and returns to S110. The error process in S230 is a process of notifying the user that editing of the icons arranged in the common area 41 cannot be executed in the current operation mode (i.e., the general mode).

When the controller 11 determines that the editing instruction has been applied to the icon arranged in the individual are 42 (S220: NO), the controller 11 proceeds to S240. In S240, the controller 11 obtains editing information in accordance with an input operation by the user. The editing information is information indicating changes in registration information associated with the target icon. Further, the controller 11 changes the registration information associated with the icon based on the obtained editing information. After changing the registration information of the icon, the controller 11 returns to S110.

When the controller 11 determines that the ADMIN button 28 is tapped (S120: YES), the controller 11 executes the authentication process in S250. When the authentication is successfully completed as authentication condition (e.g., matching of a password), the controller 11 executes a login process in S260. That is, in S290, the operation mode is switched to the ADMIN mode. Thereafter, in S270 (see FIG. 7A), the controller 11 receives a user operation to enable/disable the common area setting.

Figure 9:
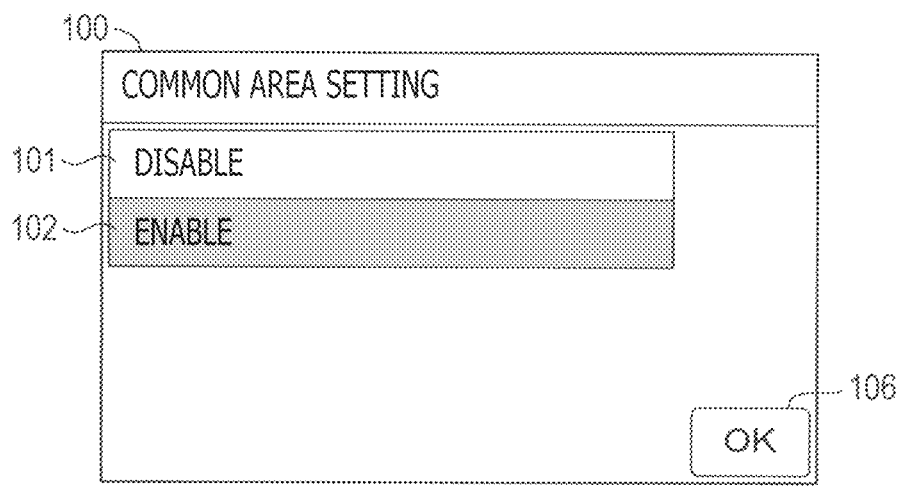
FIG. 9 shows an example of a setting selection screen according to the illustrative embodiment.

Concretely, the controller 11 displays the common area setting window 100 shown in FIG. 9 on the display 13. The user can select the common area setting by tapping one of an off button 101 or an on button 102.

In S270, when the OK button 106 is tapped in a state where the disable button 101 is selected, the controller 11 disables the common area setting. When the OK button is tapped in a state where the enable button 102 is selected, the controller 11 enables the common area setting.

In S280, the controller 11 determines whether the common area setting has been changed (i.e., changed from the disabled state to the enabled state, or changed from the enabled state to the disabled state) by the operation of S270. When the controller 11 determines that the common area setting has not been changed (S280: NO), the controller 11 proceeds to S380. When the controller 11 determines that the common area setting has been changed (S280: YES), the controller 11 proceeds to S290.

In S290, the controller 11 determines contents of the change of the common area setting. That is, the controller 11 determines whether the common area setting has been changed from the disabled state to the enabled state, or from the enabled state to the disabled state. When the controller 11 determines that the common area setting has been changed from the disabled state to the enabled state (S290: DISABLE ENABLE), the controller 11 proceeds to S300.

In S300, the controller 11 receives the user operation of selecting the tab to which the common area 41 is set. Concretely, the controller 11 displays a setting tab selection screen 110 (FIG. 10) on the display 13. On the setting tab selection screen 110, Nt tab buttons 111 respectively corresponding to the first tab to Nt-th tab are listed. The user can tap one or more tab buttons 111 corresponding to the tabs to which the common areas 41 are to be set to make the tabs in the selected state.

When the user taps an OK button 116 when one or more buttons 111 are in the selected state, the controller 11 sets the common area 41 to each of the tabs respectively corresponding to the tabs in the selected state in S310.

In S320, the controller 11 receives a user operation to select a setting range of the common area 41 in the tab screen to which the common area is set. According to the present embodiment, user is allowed to select the setting range of the common area 41 by a unit of the icons. That is, the user selects the icons to be included in the common area 41, and the controller 11 sets an area including the selected icons as the common area 41. An area including the icons which are not selected is set as the individual area 42.

In S330, the controller 11 determines whether the registered icons exist in the common area 41 selected by the user. When the controller 11 determines that no registered icon exists in the common area 41, the controller 11 proceeds to S340.

In S340, the controller 11 inquires the user whether the registered icons existing in the selected common area 41. The inquiry is made, for example, such that the controller 11 displays a screen on which the user is allowed to select whether or not the registered icons in the common area 41 can be deleted, and receives the user operation on the screen. When the user selects deletion of the registered icons in the common area 41 (S350: YES), the controller 11 deletes the all the registered icons existing within a range which is selected as the common area 41 on each tab screen to which the common area 41 is set, the deleted registered icons being registered as the unregistered icons.

When the user does not allow deletion of the registered icons in the common area 41, the controller 11 executes an avoiding process in S370. Concretely, the controller 11 moves a part of or all of the registered icons existing in the area selected as the common area 41 to the individual area(s) 42 of one or more arbitrary tab screen(s) and arrange the same therein. It is noted that the user can arbitrary select which ones of the registered icons are to be moved to the individual area(s) 42 and/or to which ones of the individual area(s) 42 of the tab screen(s). After execution of S360 or S370, the controller 11 proceeds to S380.

Figure 11:
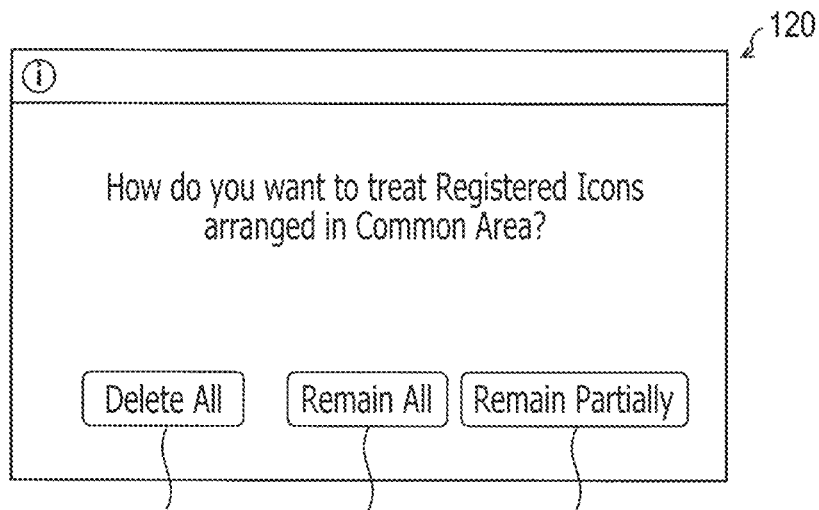
FIG. 11 shows an example of a processing method selection screen according to the illustrative embodiment.

When the common area setting is switched from the enabled state to the disabled state (S290: ENABLED→DISABLED), the controller 11 proceeds to S390. In S390, the controller 11 receives a user operation to designate a processing method of the registered icon(s) existing in the common area 41. Concretely, a processing method selection screen 120 as shown in FIG. 11 is displayed on the display 13.

On the processing method selection screen 120, a "Delete All" button 121, a "Remain All" button 122 and a "Remain Partially" button 122 are displayed. The user can instruct the "delete all" option by tapping the "Delete All" button 121, the "remain all" option by tapping the "Remain All" button 122, and the "remain partially" option by tapping the "Remain Partially" button 123.

When one of the "delete all" option, the "remain all" option and the "remain partially" option is selected in the processing method selection screen 120, the controller 11 processes the registered icons in the common area 41 of each of the common tab screens in S400 in accordance with the selected processing option. In S410, the controller 11 releases the setting of all the common areas 41 respectively set to the common tab screens. With this configuration, all the tab screens are changed to the tab screens which do not have the common areas 41. After execution of S410, the controller 11 proceeds to S380.

In S380, the controller 11 displays the standby edit screen (see FIG. 4) on the display 13. After the standby edit screen is displayed in S380, the controller 11 proceeds to S420 (see FIG. 8A).

In S420, the controller 11 determines whether a registration instruction of a new icon has been applied to an unregistered icon. When the controller 11 determines that the registration instruction of the new icon has not been applied to the unregistered icon (S420: NO), the controller 11 proceeds to S470. When the controller 11 determines that the registration instruction of the new icon has been applied to the unregistered icon (S420: YES), the controller 11 proceeds to S430. In S430, the controller 11 obtains registration information in accordance with the input operation by the user.

In S440, the controller 11 determines whether the unregistered icon to which the registration instruction has been applied is arranged in the common area 41. When the registration instruction has been applied to the unregistered icon arranged in the common area 41 (S440: YES), the controller 11 proceeds to S450. In S450, in addition to the unregistered icon to which the registration instruction has been directly applied in the currently displayed tab screen, for the unregistered icons arranged at the same position in all tab screens, the controller 11 newly registers the icons based on the registration information obtained in S430. As a result, in all the tab screens, the same icons are newly registered and arranged at the same position. After execution of S450, the controller 11 proceeds to S470.

When the controller 11 determines that the registration instruction has been applied to the unregistered icon in the individual area 42 (S440: NO), the controller 11 proceeds to S460. In S460, the controller 11 applies the registration instruction only to the unregistered icon to which the registration instruction is directly applied in the currently displayed tab screen in accordance with the registration information obtained in S430. After execution of S460, the controller 11 proceeds to S470.

Figure 8A:
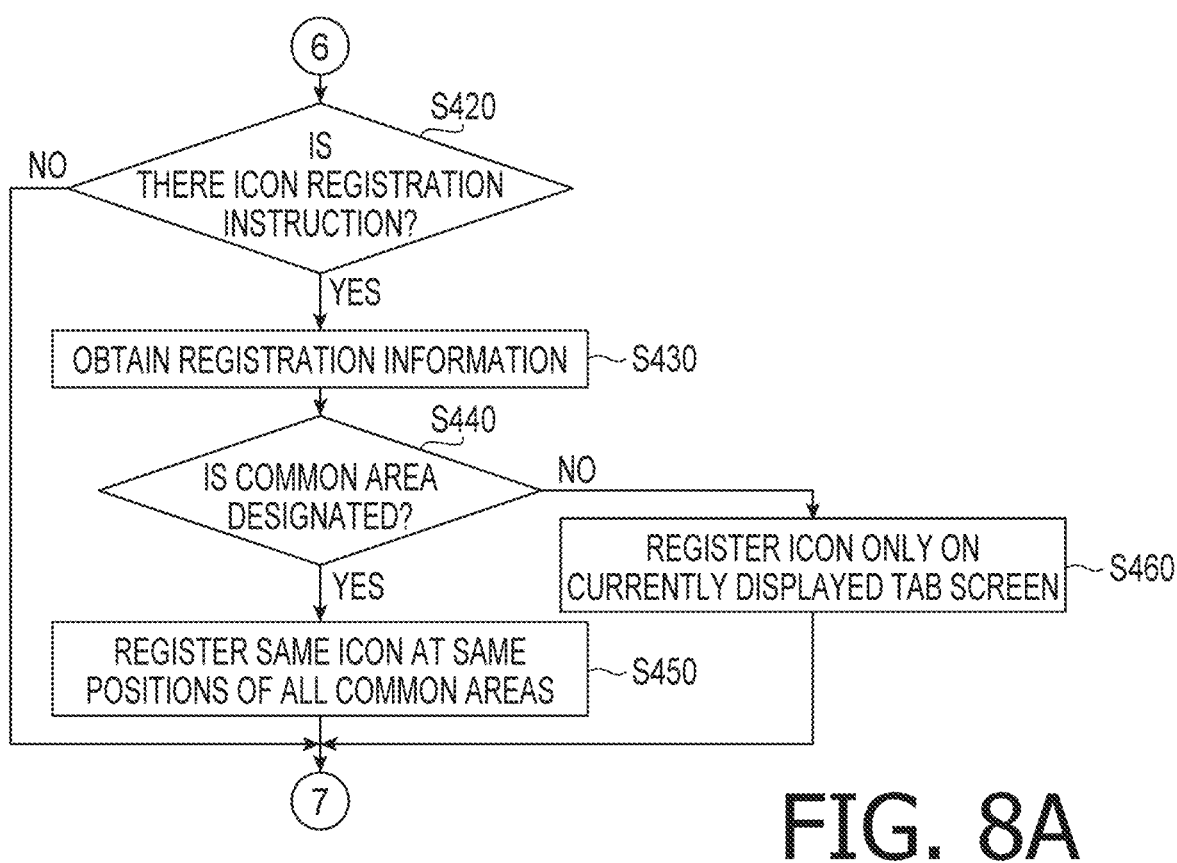
Figure 8B:
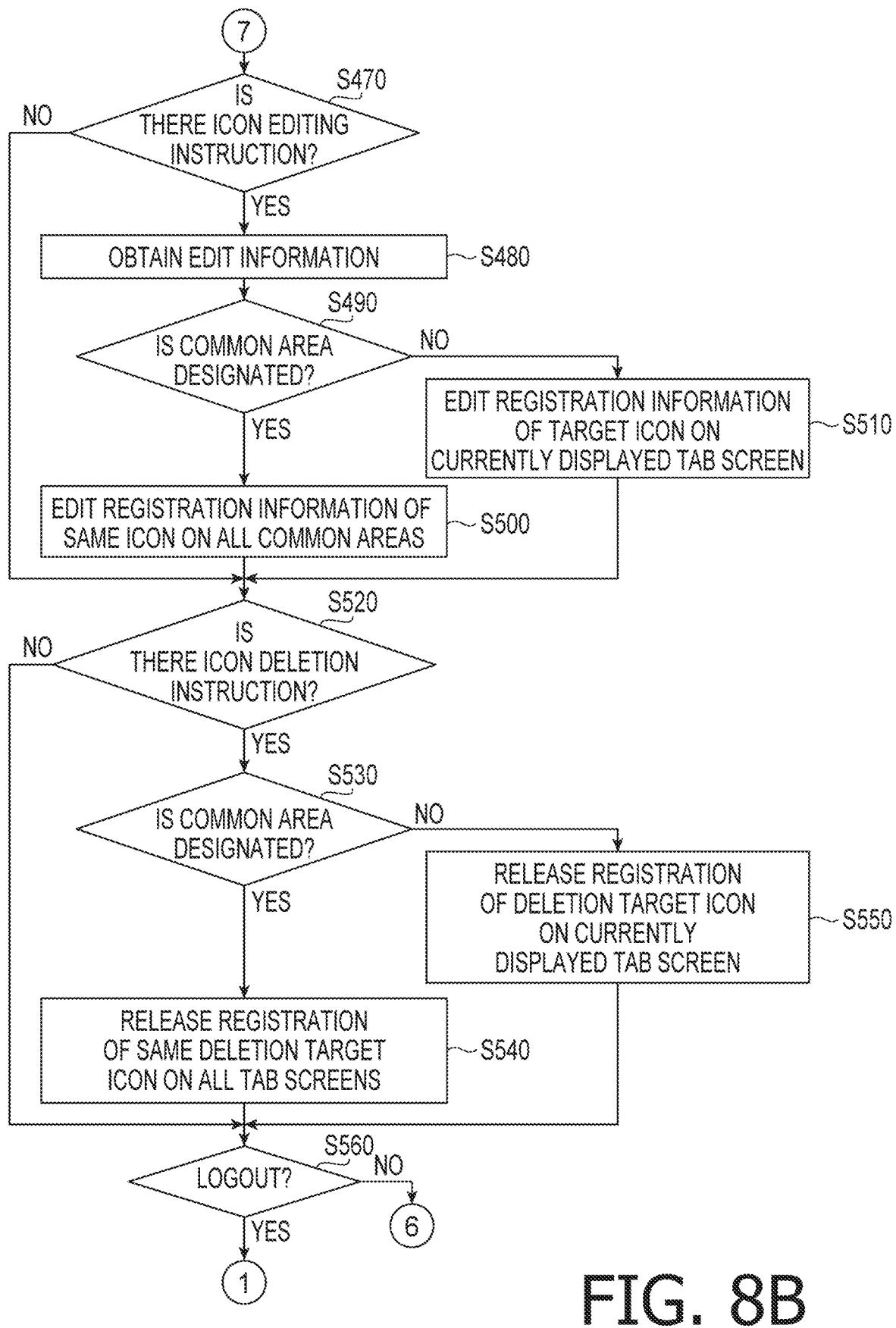

In S470, the controller 11 determines whether the editing instruction has been applied to the registered icon. When the controller 11 determines that the editing instruction has not been applied to the registered icon (S470: NO), the controller 11 proceeds to S520 (FIG. 8B). When the controller 11 determines that the editing instruction has been applied to the registered icon (S470: YES), the controller 11 proceeds to S480. In S480, the controller 11 obtains the editing information in accordance with the input operation by the user.

In S490, the controller 11 determines whether the icon to which the editing instruction is applied is arranged in the common area 41 or the individual area 42. When the controller 11 determines that the editing instruction has been applied to the icon arranged in the common area 41, the controller 11 proceeds to S500. In S5500, in addition to the icon to which the editing instruction has been directly applied in the currently displayed tab screen, for the icons arranged at the same position in all the tab screens, the controller 11 registers the registration information based on the editing information obtained in S480. As a result, in all the tab screens, the registration information is registered for the same icons arranged at the same position. After execution of S500, the controller 11 proceeds to S520 (FIG. 8B).

When the controller 11 determines that the editing instruction has been applied to the icon arranged in the individual area 42 (S490: NO), the controller 11 proceeds to S510. In S510, only for the icon to which the editing instruction has been directly applied in the currently displayed tab screen, the controller 11 registers the registration information based on the editing information obtained in S480. After execution of the editing process in S510, the controller 11 proceeds to S520.

In S520, the controller 11 determines whether deletion instruction has been applied to the registered icon. The deletion instruction in S520 is an operation of tapping the deletion button 84 after tapping a registered icon to select the same as a deletion target.

When the controller 11 determines that the deletion instruction has not been applied to the registered icon (S520: NO), the controller 11 proceeds to S560. When the controller 11 determines that the deletion instruction has been applied to the registered icon (S520: YES), the controller 11 proceeds to S530. In S530, the controller 11 determines whether the icon to which the deletion instruction is applied is arranged in the common area 41 or the individual area 42.

When the controller 11 determines that the icon to which the deletion instruction has been applied is arranged in the common area 41, the controller 11 proceeds to S540. In S540, the controller 11 deletes, in addition to the icon to which the deletion instruction has been directly applied in the currently displayed tab screen, all the icons located at the same position in all the tab screens. As a result, registration of all the icons located at the same position on all the tab screens are simultaneously released, the icons are displayed as the unregistered icons. After execution of S540, the controller 11 proceeds to S560.

When the controller 11 determines that the icon to which the deletion instruction is applied is arranged in the individual area 42 (S530: NO), the controller 11 proceeds to S550. In S550, the controller 11 deletes only the icon to which the deletion instruction is directly applied on the currently displayed tab screen. As a result, the registration of the deletion target icon is released and displayed as the unregistered icon. After execution of S550, the controller 11 proceeds to S560.

Figure 6A:
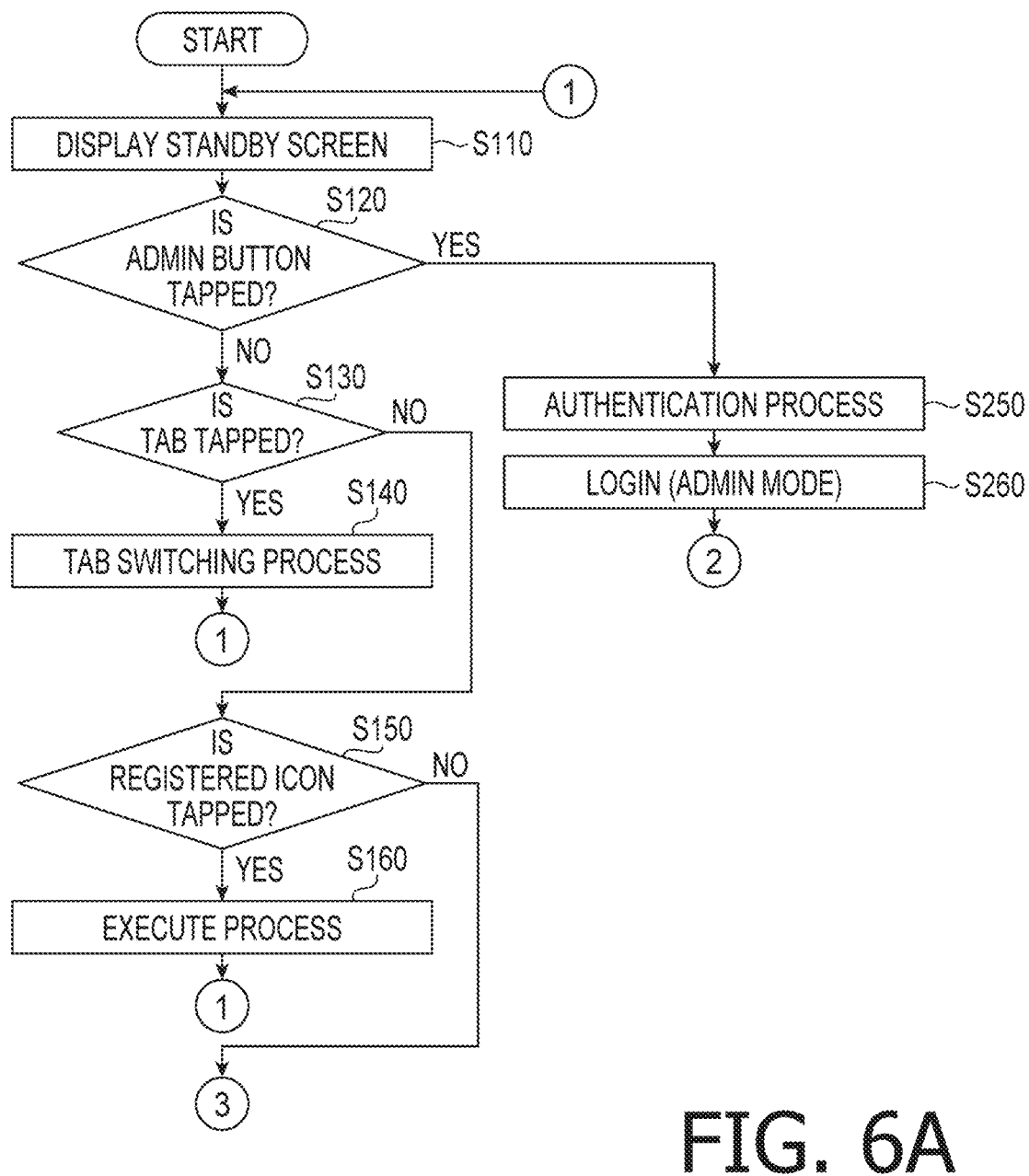
FIGS. 6A-8B show a flowchart illustrating a main control process according to the illustrative embodiment.
Figure 6B:
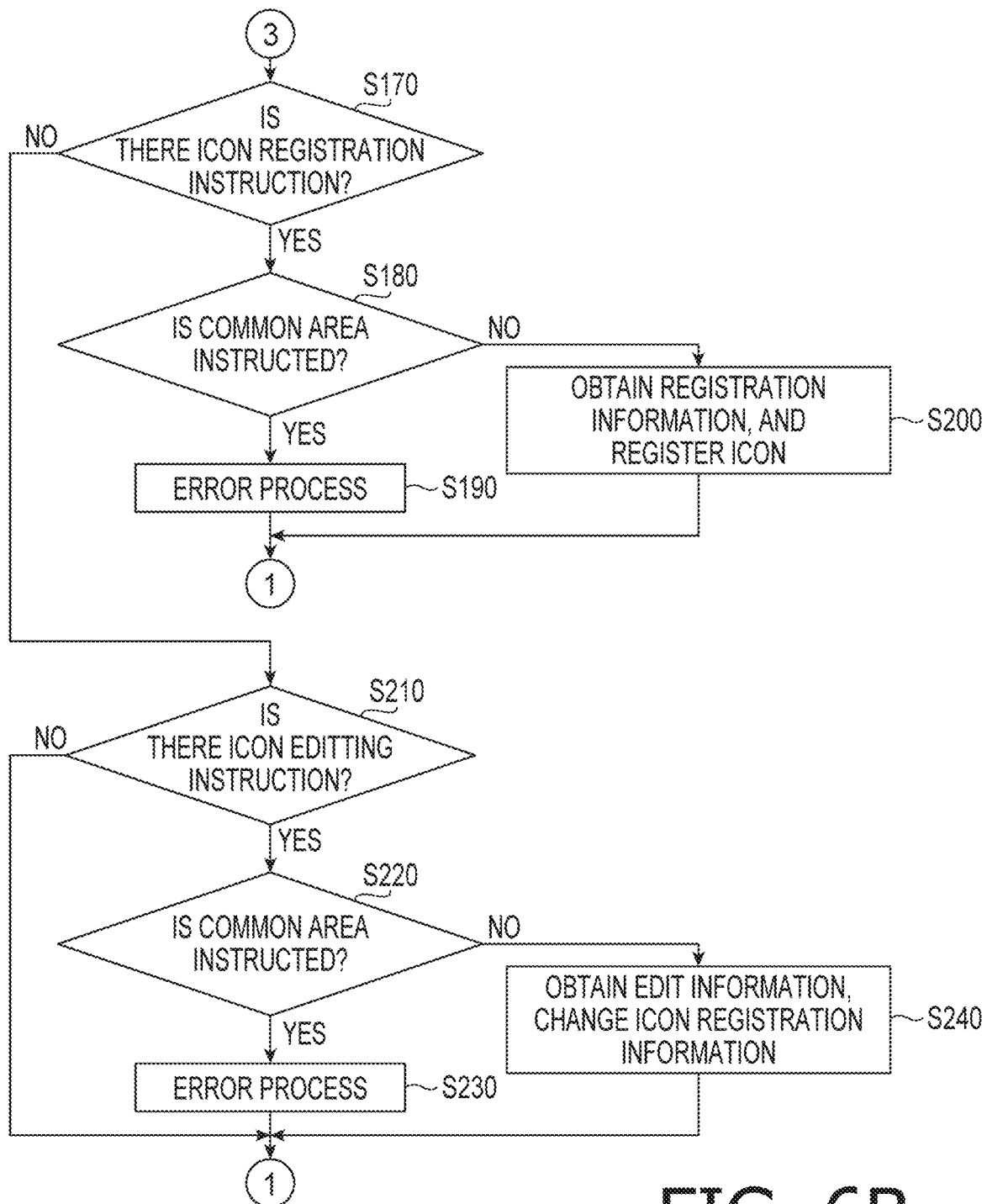

In S560, the controller 11 determines whether a particular logout operation by the user is executed. The logout operation is an operation to change the operation mode from the ADMIN mode to the general mode. When the controller 11 determines that the logout operation has not been executed (S560: NO), the controller 11 returns to S420 (FIG. 8A). When the controller 11 determines that the logout operation has been executed (S560: YES), the controller 11 returns to S110 (FIG. 6A).

(1-8) Effects of the Embodiment

According to the above-described illustrative embodiment, effects (a)-(e) below can be obtained.

(a) The user of the image forming device 10 can arbitrarily set the common areas 41 to two or more tab screens among a plurality of tab screens. In a state where any one of the tab screens to which the common area 41 is set is displayed, if the function execution icons and/or the setting icons are registered with respect to the common area 41, the registered icons are arranged not only the tab screen currently displayed, but all the tab screens, to which the common areas 41 are set, respectively.

Therefore, the user may easily arrange icons corresponding to frequently used functions in a plurality of common tab screens. With this configuration, when such functions are to be executed, the user can efficiently select the icons corresponding to the functions from among the plurality of tab screens, and thus, efficiently execute the functions.

Figure 10:
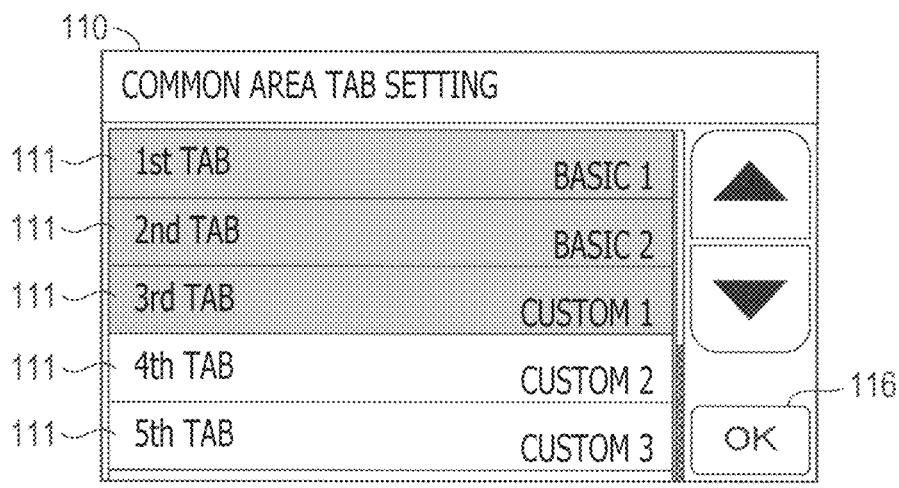
FIG. 10 shows an example of a setting tab selection screen according to the illustrative embodiment.

(b) The user can easily select a plurality of tabs (tab screens) to which the common areas 41 are set through the setting tab selection screen 110 shown in FIG. 10. Further, the user can easily change the tab screens to which the common areas 41 are set.

(c) The user can enable/disable the common area setting through the common area setting screen 100 shown in FIG. 9. Accordingly, if the common area 41 is unnecessary for the user, the user can easily remove the common areas 41 from all the tab screens simply by disabling the common area setting.

(d) When the common area 41 is set to a tab screen, and the registered icons have already been arranged in the common area of the tab screen, the user can select how to handle the registered icons in the common area 41. For example, when the registered icons arranged in the newly set common area 41 are not necessary for the user, the user can delete the same (S360). Alternatively, the user may move the registered icons arranged in the common areas 41 to the individual area 42 of any one of the tab screens so as not to be deleted (S370).

(e) When the common area setting is changed from the enabled state to the disabled state, in the tab screens to which the common areas 41 are set, the common areas 41 are released and changed to the individual areas 42. In such a case, the user can determine how the registered icons arranged in the common areas will be handled through the processing method selection screen 120 shown in FIG. 11. Concretely, the user can select one of the "delete all" option, the "remain all" option or "remain partially" option.

Accordingly, if the user want to remain the registered icons arranged in the common areas as they are after the common areas are changed to the individual areas, they can be remained by selecting the "remain all" option. In contrast, if all the registered icons arranged in the common areas are unnecessary for the user, all the registered icons arranged in the common areas can be deleted and changed to the unregistered icons by selecting the "delete all" option. If the user want to remain part of the registered icons arranged in the common areas and delete the others, the user may select the "remain partially" option.

It is noted that each of the registered icons to which the function or setting item is assigned in the above-described embodiment is an example of a particular icon.

2. Other Embodiments

It is noted that the aspects of the present disclosures need not be limited to the above-described configuration, but can be modified in various ways.

(2-1) In the above-described embodiment, the user can select the tab screens to which the common areas are set through the setting tab selection screen 100 shown in FIG. 10. The configuration may be modified such that the tab screens to which the common areas are set are selected in accordance with another method. For example, the configuration may be modified such that, when the user applies a particular operation with respect to the tab displayed on the standby screen 25 in a state where the standby screen 25 is displayed, whether the common area is to be set or not may be selected for each tab (i.e., each tab screen).

Figure 7A:
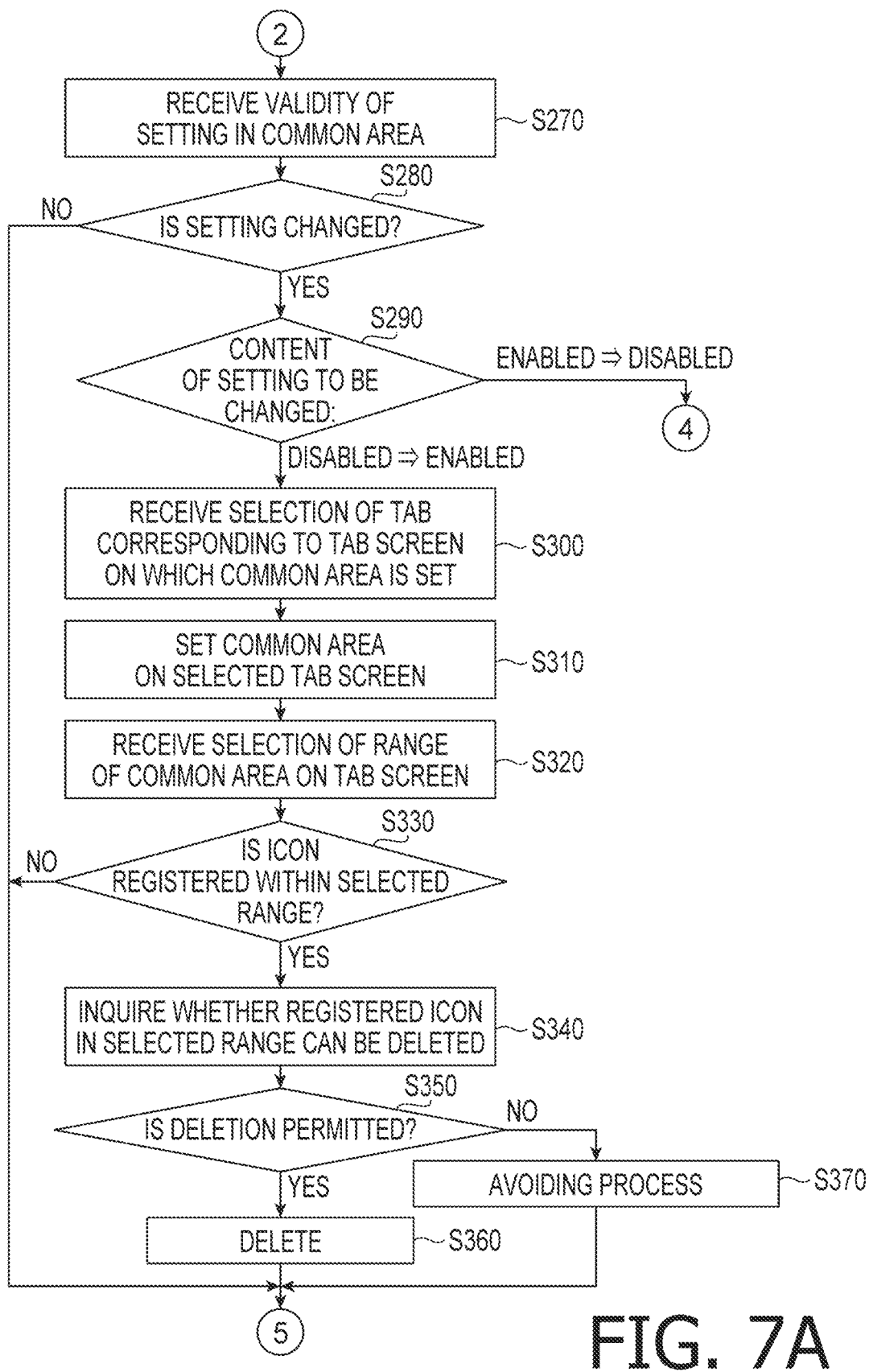
Figure 7B:
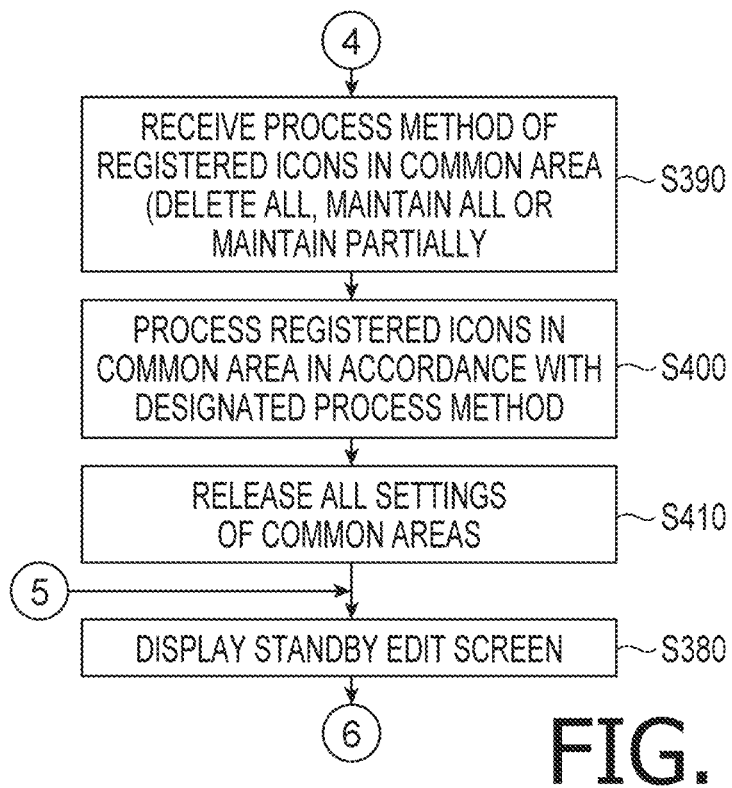

(2-2) FIGS. 7A and 7B show that selection of the tab screens to which the common areas are set (S300) and selection of the range of the common area on the tab screen (S320) are possible when the common area setting is changed from the disabled state to the enabled state. In contrast, the configuration may be modified such that, even when a state where the common area setting are kept enabled, the user may change the tab screens to which the common areas are set and/or a range of the common area within the tab screen at an arbitrary timing.

According to the above-described embodiment, the upper half of the tab screen is defined as the common area 41 and the lower half of the tab screen is defined as the individual area 42. Such a division of areas is only an example and the user can arbitrarily determine a range each of the areas 41 and 42.

(2-3) According to the above-described embodiment, the number of the icons arranged in the common area 41 is four. It is noted that the number of the icons arranged in the common area 41 can be the number other than four. Similarly, the number of the icons arranged in the individual area 42 can be the number other than four.

(2-4) Further, how the icons are arranged in each of the common area 41 and the individual area 42, and how each icon is shaped may be arbitrarily determined.

(2-5) The total number Nt of the tabs may be equal to or less than the maximum number (which is four in the above-described embodiment) of the tabs which can be displayed on the standby screen 25 simultaneously.

(2-6) Even in the general mode, moving the icons, swapping the icons and/or deleting the icons in each of the common area 41 and the individual area 42 may; be enabled. Further, movement of an icon between the common area 41 and the individual area 42 and/or exchanging the icons between the common area 41 and the individual area 42 may be enabled. In the above-described embodiment, in the individual area 42, registration of a new icon, edition of the icon are allowed even in the general mode. However, such a configuration may be modified such that registration of a new icon, edition of the icons in the individual area 42 may be prohibited even in the general mode. Alternatively, registration of a new icon, edition of the icons both in common area 41 and the individual area 42 may be allowed even in the general mode.

(2-7) A method of making the common area 41 and the individual area 42 visually distinguishable can be determined arbitrarily. For example, ground colors and/or ground patterns of the areas 41 and 42 may be differentiated. Optionally or alternatively, the colors, patterns and/or shapes of the icons arranged in the areas 41 and 42 may be differentiated. Further optional or alternatively, boundary lines may be displayed at boundary between the areas 41 and 42.

(2-8) A plurality of functions one component of the above-described embodiment has may be realized by a plurality of components, or one function a single component of the above-described embodiment has may be realized by a plurality of components. Further, a plurality of functions which a plurality of components have may be realized by a single component, or a single function realized by a plurality of components may be realized by a single component. Further, a part of configuration of the above-described embodiment may be omitted. Further, at least a part of the configuration of the above-described embodiment may be added to another (alternative) configuration of the above-described embodiment, or replaced with other components.

What is claimed is:

1. A display control device, comprising:
   a display;
   an input device; and
   a controller,
   wherein the controller is configured to execute:
      causing the display control device to display at least a first tab, a second tab and a third tab, and a tab screen corresponding to one of a first tab screen corresponding to the first tab, a second tab screen corresponding to the second tab and a third tab screen corresponding to the third tab, a plurality of icons being arrangeable in each of the first tab screen, the second tab screen and the third tab screen, the plurality of icons including a first icon assigned with a first process and a second icon assigned with the first process;

receiving, through the input device, a particular selecting operation to select the first tab screen and the second tab screen, from among the first tab screen, the second tab screen and the third tab screen;

setting a first area to the first tab screen selected by the particular selecting operation and setting a second area to the second tab screen selected by the selecting operation;

when the first tab screen is displayed on the display, receiving, through the input device, a particular arranging operation to arrange the first icon with respect to the first area on the first tab screen currently displayed; and arranging, based on the particular arranging operation, the first icon in the first area of the first tab screen and arranging the second icon in the second area of the second tab screen without receiving the particular arranging operation on the second tab screen and without arranging an icon assigned with the first process on the third tab screen.

2. The display control device according to claim 1, wherein the controller is further configured to receive, through the input device, an area designating operation to designate the first area and the second area, and wherein, in setting the first area to the first tab screen and the second area to the second tab screen, the controller uses the designated areas received by the area designating operation.

3. The display control device according to claim 2, wherein the controller is configured such that, when the first area is set in the first tab screen and the first icon has already been arranged in the first area, the controller deletes the first icon.

4. The display control device according to claim 1, wherein the controller is further configured to:

receive, through the input device, a setting selecting operation to select one of enabling and disabling setting of the first area on the first tab screen and the second area on the second tab screen; and setting the first area on the first tab screen and the second area on the second tab screen to one of an enabled state and a disabled state in accordance with the selecting operation, wherein the controller accept the particular selecting operation only when the first area of the first tab screen and the second area of the second tab screen are enabled.

5. The display control device according to claim 4, wherein the controller is configured such that, when the setting state of the first area and the second area are changed from the enabled state to the disabled state, the controller releases the setting of the first area and the second area on the first tab screen and the second tab screen, respectively, before the setting state of the first area and the second area are changed.

6. The display control device according to claim 5, wherein the controller is configured such that, when the setting of the first area on the first tab screen and the second area on the second tab screen are released and when the first icon and the second icon are arranged in the first area and the second area, respectively, the controller executes one of:

deleting the first icon currently arranged in the first area on the first tab screen and the second icon currently arranged in the second area on the second tab screen;

keeping an arrangement of the first icon currently arranged in the first area on the first tab screen and the second icon currently arranged in the second area on the second tab screen;

keeping an arrangement of the first icon currently arranged in the first area on the first tab screen, and deleting the second icon currently arranged in the second area of the second tab screen.

7. A display control method employed in a display control device provided with a display and an input device, wherein the method includes:

causing the display control device to display at least a first tab, a second tab and a third tab, and a tab screen corresponding to one of a first tab screen corresponding to the first tab, a second tab screen corresponding to the second tab and a third tab screen corresponding to the third tab, a plurality of icons being arrangeable in each of the first tab screen, the second tab screen and the third tab screen, the plurality of icons including a first icon assigned with a first process and a second icon assigned with the first process;

receiving, through the input device, a particular selecting operation to select the first tab screen and the second tab screen, from among the first tab screen, the second tab screen and the third tab screen;

setting a first area to the first tab screen selected by the particular selecting operation and setting a second area to the second tab screen selected by the selecting operation;

when the first tab screen is displayed on the display, receiving, through the input device, a particular arranging operation to arrange the first icon with respect to the first area on the first tab screen currently displayed; and arranging, based on the particular arranging operation, the first icon in the first area of the first tab screen and arranging the second icon in the second area of the second tab screen without receiving the particular arranging operation on the second tab screen and without arranging an icon assigned with the first process on the third tab screen.

8. A non-transitory computer-readable medium containing instructions to be executed by a controller of a display control device having a display, an input device and the controller, the instructions causing, when executed by the controller, the display control device to execute:

displaying at least a first tab, a second tab and a third tab, and a tab screen corresponding to one of a first tab screen corresponding to the first tab, a second tab screen corresponding to the second tab and a third tab screen corresponding to the third tab, a plurality of icons being arrangeable in each of the first tab screen, the second tab screen and the third tab screen, the plurality of icons including a first icon to which a first process is assigned and a second icon assigned with the first process, receiving, through the input device, a particular selecting operation to select the first tab screen and the second tab screen, from among the first tab screen, the second tab screen and the third tab screen;

setting a first area to the first tab screen selected by the particular selecting operation and setting a second area to the second tab screen selected by the selecting operation;

when the first tab screen is displayed on the display, receiving, through the input device, a particular arranging operation to arrange the first icon with respect to the first area on the first tab screen currently displayed; and arranging, based on the particular arranging operation, the first icon in the first area of the first tab screen and arranging the second icon in the second area of the second tab screen without receiving the particular arranging operation on the second tab screen and without arranging an icon assigned with the first process on the third tab screen.

9. The non-transitory computer-readable medium according to claim 8, wherein the instructions further causes, when executed by the controller, the display control device to execute:

receiving, through the input device, an area designating operation to designate the first area and the second area, and using the received designated areas in setting the first area to the first tab screen and the second area to the second tab screen.

10. The non-transitory computer-readable medium according to claim 9, wherein the instructions further causes, when executed by the controller, the display control device to delete the first icon when the first area is set and the first icon has already been arranged in the first area.

11. The non-transitory computer-readable medium according to claim 8, wherein the instructions further causes, when executed by the controller, the display control device to execute:

receive, through the input device, a setting selecting operation to select one of enabling and disabling setting of the first area on the first tab screen and the second area on the second tab screen; and setting the first area on the first tab screen and the second area on the second tab screen to one of an enabled state and a disabled state in accordance with the selecting operation, accepting the particular selecting operation only when the first area of the first tab screen and the second area of the second screen are enabled.

12. The non-transitory computer-readable medium according to claim 11, wherein the instructions further causes, when executed by the controller, the display control device to releases the setting of the first area on the first tab screen and the second area on the second tab screen before the setting state of the first area and the second area are changed when the setting state of the first area and the second area is changed from the enabled state to the disabled state.

13. The non-transitory computer-readable medium according to claim 12, wherein the instructions further causes, when executed by the controller, the display control device to execute, when the setting of the first area on the first tab screen and the second area on the second tab screen and when the first icon and the second icon are arranged in the first area and the second area, respectively, one of:

deleting the first icon currently arranged in the first area on the first tab screen and the second area on the second tab screen;

keeping an arrangement of the first icon currently arranged in the first area on the first tab screen and the second area on the second tab screen;

keeping an arrangement of the first icon currently arranged in the first area on the first tab screen, and deleting the second icon currently arranged in the second area on the second tab screen.

* * * * *